United States Patent [19]
Cherpantier

[11] Patent Number: 5,960,352
[45] Date of Patent: *Sep. 28, 1999

[54] MULTILAYER CELLULAR MOBILE RADIO NETWORK WITH OPTIMIZED FREQUENCY RE-USE PLAN, AND ASSOCIATED METHOD

[75] Inventor: Corinne Cherpantier, Garches, France

[73] Assignee: Alcatel Mobile Communication France, Paris, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/556,094

[22] Filed: Nov. 9, 1995

[30] Foreign Application Priority Data

Nov. 10, 1994 [FR] France ................... 94 13553

[51] Int. Cl.$^6$ ................................. H04Q 7/34
[52] U.S. Cl. ................ 455/451; 455/452; 455/511
[58] Field of Search .................... 455/33.1–33.4, 455/34.1, 49.1, 56.1, 57.1, 446–453, 436, 443, 444, 507, 509, 511, 524; 370/328–329, 321, 330, 436, 478, 523, 528

[56] References Cited

U.S. PATENT DOCUMENTS

| | | | |
|---|---|---|---|
| 5,263,176 | 11/1993 | Kojima et al. | 455/34.1 |
| 5,278,835 | 1/1994 | Ito et al. | 455/54.1 |
| 5,353,332 | 10/1994 | Raith et al. | 455/33.2 |
| 5,437,054 | 7/1995 | Rappaport et al. | 455/447 |
| 5,483,666 | 1/1996 | Yamada et al. | 455/449 |
| 5,546,443 | 8/1996 | Raith | 455/33.1 |
| 5,608,780 | 3/1997 | Gerszberg et al. | 455/450 |
| 5,625,672 | 4/1997 | Yamada | 455/449 |

FOREIGN PATENT DOCUMENTS

| | | | |
|---|---|---|---|
| 2260879 | 4/1993 | United Kingdom | H04B 7/26 |
| WO9410792 | 5/1994 | WIPO | H04N 11/00 |

OTHER PUBLICATIONS

H. Eriksson, Personal Communications —a Possible Evolution of Cellular TDMA, *ICC '93. IEEE International Conference on Communications '93*, vol. 2, May 23–26, 1993, Geneva, CH, pp. 930–934.

*Primary Examiner*—Vu Le
*Attorney, Agent, or Firm*—Sughrue, Mion, Zinn, Macpeak & Seas, PLLC

[57] ABSTRACT

In a combined time-division multiple access and frequency-division multiple access multilayer cellular mobile radio network comprising macrocells and microcells, each macrocell being associated with at least one control frequency and at least one traffic frequency and each microcell being associated with at least one control frequency, a method of optimizing frequency use when adding any microcell base station defining a given microcell that is part of a coverage area of a given macrocell includes the step of allocating to said microcell a control frequency identical to a traffic frequency used in a macrocell immediately adjacent said given macrocell.

14 Claims, 3 Drawing Sheets

7 - CELL FREQUENCY RE-USE PATTERN

MULTILAYER CELLULAR MOBILE RADIO NETWORK WITH OPTIMIZED FREQUENCY RE-USE PLAN, AND ASSOCIATED METHOD

BACKGROUND OF THE INVENTION

1. Field of the Invention

The present invention concerns a multilayer cellular mobile radio network. A network of this kind comprises first base stations defining respective macrocellular coverage areas (macrocells) and second base stations defining respective microcellular coverage areas (microcells). The term "microcell" covers both the picocell and the microcell concept. Microcells have a small diameter and are used to meet local demand, for example to provide service in geographical areas with a relatively high concentration of mobiles, such as road junctions, shopping streets, airports and shopping centers in the case of microcells and floors of a building in the case of picocells, or to provide service in boxed in areas where radio access is difficult. Macrocells have a substantially greater diameter and provide coverage of areas with a lower density of mobiles and more extensive radio access. A microcell can be "internal", in which case it is part of a macrocell which covers it, the term "macrocell" then being used to denote the outermost layer of a cellular structure, or "external", in which case it is not covered by any macrocell.

The cellular architecture of a mobile radio network gives rise to the problem of frequency re-use, that can be formulated generically as follows: a frequency used in a given cell typically cannot be re-used in a cell immediately adjacent said given cell. If macrocells and microcells co-exist, frequency planning usually proceeds in two stages, respectively relating to the macrocells and to the microcells. Planning problems arise in particular if new microcells are added to meet local demand.

2. Description of the Prior Art

The first planning stage is concerned only with the macrocells. These share a given frequency spectrum and a geometrical pattern of frequency re-use is defined and this defines a minimal distance between two macrocells that can use the same frequency. In a combined time-division multiple access (TDMA) and frequency-division multiple access (FDMA) radio system, of the GSM or DCS-1800 type, the frequency hopping technique offers a statistically significant improvement in traffic link quality by enabling the use of a limited number of identical frequencies in neighboring cells, as described in "The GSM System for Mobile Communications" written and published by M. B. Pautet and M. Mouly, 1992 edition, pages 218–223.

The second planning stage concerns the microcells. Two techniques are used.

The first technique dedicates a first portion of the total spectrum available for use by microcells only. In this case, this first portion is strictly reserved for microcells and cannot be used by macrocells. A second portion, complementary to this first portion throughout the available spectrum, is dedicated to macrocells and cannot be used by microcells. Using this technique, in an area covered by a macrocell containing only a few microcells, spectrum sharing can seem unfavorable for said macrocell. The microcells, used for a small geographical area, are called upon to support calls less often than the macrocell and have a large portion of the total available spectrum for this small area, while the macrocell alone is used for a large geographical area, and for this has only a relatively small portion of the total spectrum. On the other hand, in an area covered by a macrocell containing many microcells, the sharing of the spectrum is unfavorable to the microcells. The microcells are used for a large geographical area and have a relatively small portion of the total spectrum available for this large area, while the macrocell is used for a small geographical area and has a relatively large portion of the total spectrum for this.

The second technique uses in a given microcell a portion of the spectrum corresponding to a portion of the spectrum used by macrocells very far away. In this case, the total capacity of the macrocells, in terms of the spectrum, is not affected by spectrum sharing. This second technique, as briefly described in European patent application EP-A-2 697 390 (ERICSSON), is nevertheless subject to the limitation that it can be used only if a geometrical pattern of frequency re-use is defined that limits the available spectrum band for each macrocell.

This is explained with reference to FIG. 1, which shows a pattern of frequency-reuse with seven cells. Using this pattern, the total spectrum available is divided into seven different frequency sub-bands A, B, C, D, E, F and G. Each macrocell, represented as a hexagon, is contiguous with and surrounded by six macrocells using six respective frequency bands each separate from its frequency band. For a given microcell belonging to one of these macrocells, a geographical pattern of frequency re-use of this kind rules out the use by this microcell of any of the frequencies of the total spectrum available, since this frequency is used by a macrocell the coverage area of which is at a distance less than the diameter of a macrocell from said microcell, and would therefore cause interference. To solve this problem it would be necessary to extend the pattern to a very large number of cells so that each macrocell is not contiguous with and surrounded by macrocells that together define the totality of the available spectrum. This would go against optimizing spectrum use by the macrocell, since the portion of the spectrum assigned to each macrocell is small.

Patent application GB-A-2 260 879 describes a method of assigning a control channel to a microcell to be installed. In this method, the microcell to be installed measures the power level of the traffic channels of surrounding macrocells and selects the traffic channel on which the power level is the lowest, and this channel is used as a control frequency in the microcell to be installed. This method has the major drawback of using as the control channel in the microcell to be installed a frequency identical to a frequency of a traffic channel in a macrocell that is by definition far from the micrccell to be installed. This rules out use of this same frequency as a traffic channel in said microcell to be installed and therefore places a limitation on the capacity of the network.

SUMMARY OF THE INVENTION

The invention is directed to overcoming the aforementioned drawbacks of the prior art, which impose a limitation on frequency re-use in GSM type cellular mobile radio networks.

The invention consists of a method of optimizing frequency use in a multilayer cellular mobile radio network when adding any microcell base stations defining a given microcell that is part of a coverage area of a given macrocell, said network being a combined time-division multiple access and frequency-division multiple access network and comprising macrocells and microcells, each macrocell being associated with at least one control frequency and at least one traffic frequency and each microcell being associated with at least one control frequency, said method comprising the step of allocating to said microcell a control frequency identical to a traffic frequency used in a macrocell immediately adjacent said given macrocell.

The prior art limitation on possible use of frequencies by macrocells and microcells is the result of the fact that the prior art does not distinguish the various frequencies according to their nature for frequency planning purposes. In the context of a GSM type combined time-division multiple access and frequency-division multiple access cellular mobile radio network, it is opportune to distinguish, for a given cell, microcell or macrocell, a control frequency from a traffic frequency. In a GSM type cellular network, a duplex mode of radio transmission is adopted between base stations and mobiles using one or more pairs of frequencies, each frequency of each pair being respectively associated with uplink transmission from the mobiles to the base stations and downlink transmission from the base stations to the mobiles. The radio transmission channel is organized into uplink and downlink frames each having a duration of 4.615 ms and comprising N=8 time slots or windows. Each time slot associated with a frequency forms a channel.

Respective uplink and downlink control frequencies convey signalling channels from the mobiles to the base stations and from the base stations to the mobiles. These signalling channels comprise one-way channels (BroadCast CHannels BCCH) for broadcasting general information comprising frequency synchronization subchannels (FCH) and time synchronization subchannels (SCH), one-way Common Control CHannels (CCCH) and possibly, for example in low capacity cells (microcells), two-way channels for exchange of signalling data (Stand-alone Dedicated Control CHannels (SDCCH)). In the downlink direction the downlink control frequency is transmitted continuously to enable the mobiles to measure the power received from the base station concerned and conveys, with a maximal repetition rate of one time slot per frame (i.e. one time slot in eight), all the BCCH and some of the CCCH, namely a mobile calling channel and a resource allocation channel, and possibly downlink SDCCH for updating subscriber tables in the mobiles. In the uplink direction, the uplink control frequency conveys, with a maximum repetition rate of one time slot per frame (or a lower rate, dependent on the needs of the terminals), the remaining common control channel, namely a random access channel (RACH) and possibly uplink SDCCH.

Respective uplink and downlink traffic frequencies convey a two-way traffic channel from a mobile to the base station and from the base station to the mobile, also with a repetition rate of one time slot per frame, as soon as the traffic channel is established.

To summarize:

the downlink control frequency is transmitted continuously, the uplink control frequency is transmitted with a maximal repetition rate of one time slot per frame, depending on the requirements of the terminals, respective uplink and downlink traffic frequencies are transmitted with a repetition rate of one time slot per frame as soon as a call is set up.

The invention exploits these features to define a radio communication network having an optimized frequency re-use plan. In this multilayer cellular mobile radio network a microcell belonging to a coverage area of a given macrocell uses a control frequency identical to a traffic frequency used in a macrocell immediately adjacent to said given macrocell.

The cellular network typically uses a duplex mode on respective uplink and downlink frequencies and the microcell uses an uplink control frequency identical to an uplink traffic frequency used in the adjacent macrocell and a downlink control frequency identical to a downlink traffic frequency used in this adjacent macrocell.

The network advantageously covers an urban area and is a GSM or DCS-1800 network.

A microcell in accordance with the invention belonging to a coverage area of a given macrocell uses a control frequency identical to a traffic frequency used in a macrocell adjacent said given macrocell.

Finally, the invention concerns a frequency allocation unit for a microcell belonging to a coverage area of a given macrocell. This unit comprises means for allocating to said microcell a control frequency identical to a traffic frequency used in a macrocell immediately adjacent said given macrocell.

Other features and advantages of the present invention will emerge more clearly from a reading of the following description with reference to the corresponding appended drawings.

DETAILED DESCRIPTION OF THE PREFERRED EMBODIMENT

Figure 1:
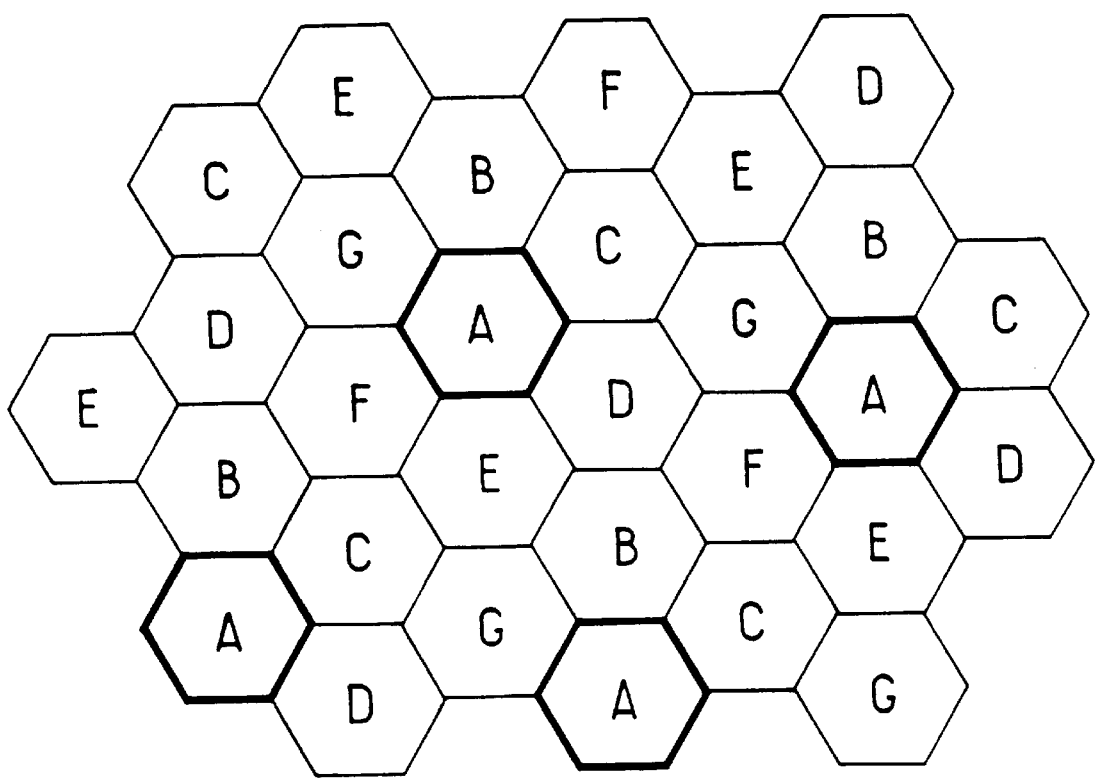
FIG. 1, already commented on, shows a geometrical pattern of frequency re-use with seven cells in a cellular mobile radio network.
Figure 2:
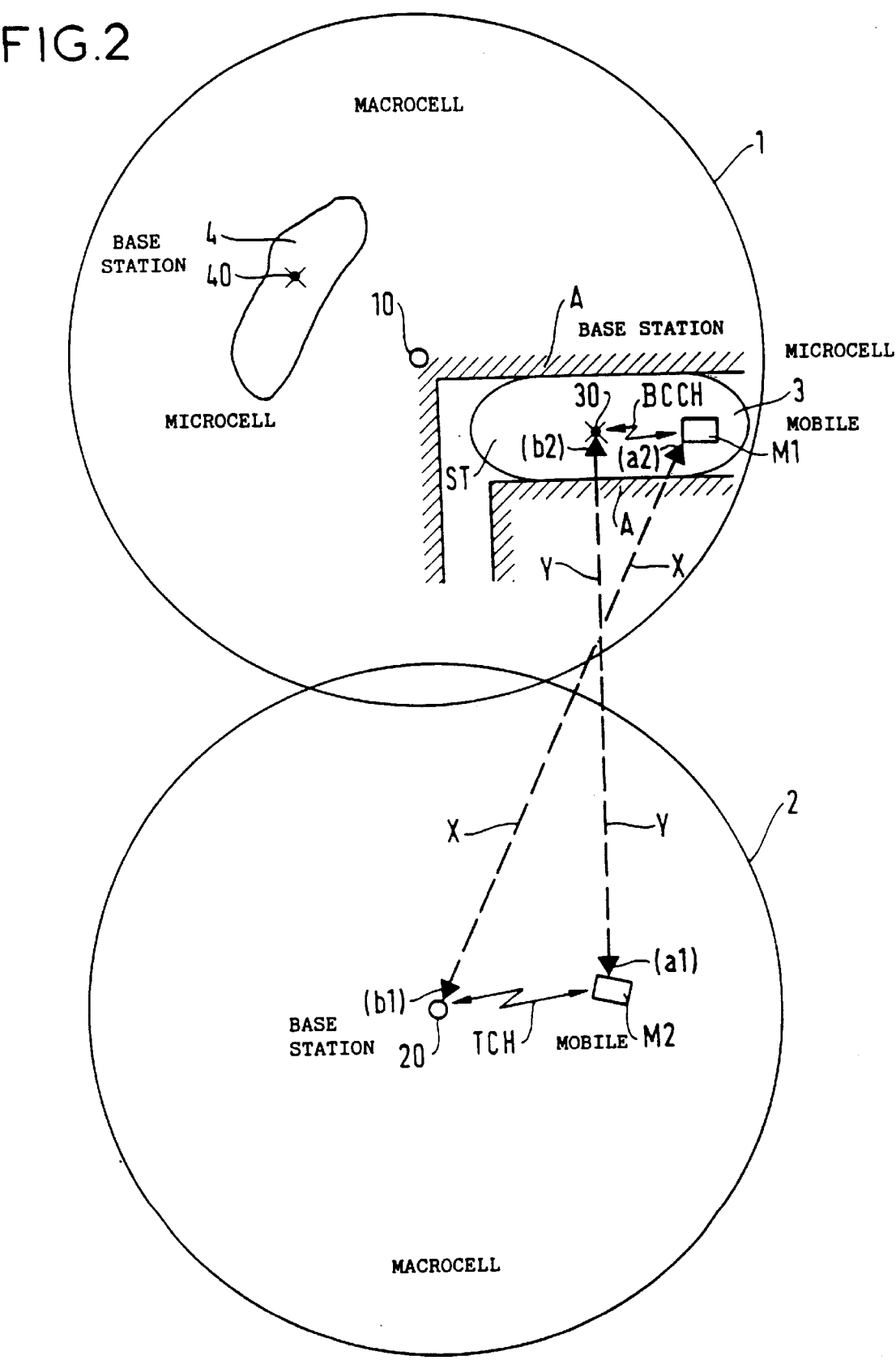
FIG. 2 shows part of a multilayer cellular mobile radio network including a microcell and a macrocell respectively using identical pairs of control frequencies and pairs of traffic frequencies.

Referring to FIG. 2, a multilayer cellular mobile radio network comprises N=2 first base stations 10 and 20 defining respective macrocellular coverage areas (macrocells) 1 and 2 and M=2 second base stations 30 and 40 defining respective microcellular coverage areas (microcells) 3 and 4. The macrocells 1 and 2 are immediately adjacent and the microcell 3, which is in the coverage area of the macrocell 1, is outside the coverage area of the macrocell 2. The invention uses in microcell 3, which is part of macrocell 1, a pair of uplink and downlink control frequencies identical to a pair of traffic frequencies used in macrocell 2 which is immediately adjacent said macrocell 1. In the GSM terminology, the control frequencies are called "BCCH frequencies" and the traffic frequencies are called "TCH frequencies". Two mobiles M1 and M2 are shown, belonging respectively to microcell 3 and macrocell 2. The uplink and downlink control frequencies of the pair of control or BCCH frequencies in the microcell 3 are used to convey signalling channels between the mobile M1 and the microcell base station 30. The uplink and downlink traffic or TCH frequencies in the macrocell 2 are used to convey a two-way traffic channel between the mobile M2 and the macrocell base station 20.

The macrocells 1 and 2 are immediately adjacent or contiguous in the sense that there is no other macrocell between them; they can nevertheless be separated by a short distance. In the context of the invention, and conforming to the distinction made in the GSM system, a single control frequency is defined for each cell, macrocell or microcell, and any frequency that is not a control frequency in that cell is a traffic frequency. A control frequency can additionally be used to convey one or more traffic channels and a traffic frequency, by definition different from the control frequency, cannot be used to convey BCCH and CCCH. In the microcells 3 and 4, the BCCH control frequency may not be used to convey traffic channels, for example if the microcells use the frequency hopping technique. Each microcell base station then comprises an additional transmitter dedicated to transmitting BCCH and CCCH signalling channels.

The effects of interference between macrocell 2 and microcell 3 must be considered to justify the technical validity of the invention and the remarkable nature of its implementation. There can be four kinds of interference between the two cells 2 and 3:

(a) in the downlink direction:
  (a1) the downlink BCCH control frequency transmitted continuously by the microcell base station 30 can interfere with the downlink traffic channel TCH, if any, transmitted from the macrocell base station 20 to the mobile M2 and, reciprocally:
  (a2) this downlink traffic channel transmitted from the macrocell base station 20 to the mobile M2 can interfere with the downlink BCCH control frequency transmitted continuously by the microcell base station 30 to the mobile M1, and
(b) in the uplink direction:
  (b1) a signalling channel conveyed by the uplink BCCH control frequency and transmitted by the mobile M1 to the microcell base station 30 can interfere with the uplink traffic channel transmitted from the mobile M2 to the macrocell base station 20, and, reciprocally:
  (b2) this uplink traffic channel transmitted from the mobile M2 to the macrocell base station 20 can interfere with the signalling channel conveyed by the uplink BCCH control frequency transmitted by the mobile M1 to the microcell base station 30.

Two double-headed dashed line arrows X and Y are shown in FIG. 2. Each head of an arrow points to a respective mobile M1, M2 or base station 20, 30 receiving the control frequency signal or the signalling channel or a traffic channel that may be subject to interference, and is denoted (a1), (a2), (a3) or (a4) according to the nature of the interference, as defined above.

Figure 3:
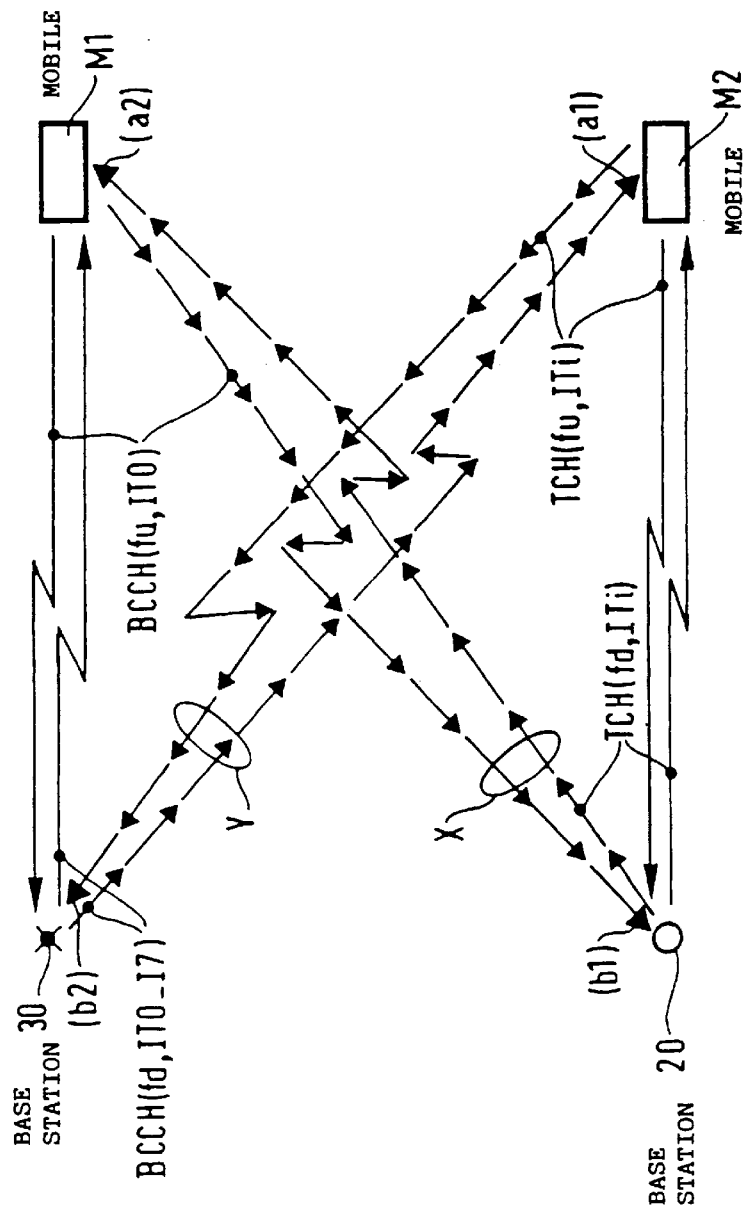
FIG. 3 is a diagram showing a balance of interference between the microcell and the macrocell shown in FIG. 2.

FIG. 3 defines in more detail than FIG. 2 a balance of interference between microcell 3 and macrocell 2, for both the uplink and the downlink directions, and the effect of each kind of interference is considered below with reference to this figure. In FIG. 3, BCCH(fu, IT0) is the uplink signalling channel conveyed by the uplink control frequency fu in a first time slot IT0 of each frame. BCCH(fd, IT0–IT7) is the downlink control frequency signal at the frequency fd transmitted continuously for each of the time slots IT0 through IT7 of the frame. TCH(fu, ITi) and TCH(fd, ITi) are respectively an uplink traffic channel at the traffic frequency fu in any time slot ITi of the uplink frame, with i between 0 and 7, and a downlink traffic channel at the traffic frequency fd in the same downlink frame time slot ITi.

I/Interference between microcell base station 30 and mobile M2.

The two sorts of interference between microcell base station 30 and mobile M2 are shown by the two dashed line arrows Y in FIG. 3. As described previously, they are, firstly:

(b2)—interference with the uplink signalling channel BCCH(fu, IT0) transmitted from the mobile M1 to the microcell base station 30 by the uplink traffic channel TCH(fu, ITi) transmitted by the mobile M2 to the macrocell base station 20, and, secondly:

(a1)—interference with the downlink traffic channel TCH(fd, ITi) transmitted from the macrocell base station 20 to the mobile M2 by the control frequency BCCH(fd, IT0–IT7) transmitted continuously by the microcell base station 30.

In practice, this uplink and downlink interference between microcell base station 30 and mobile M2 is virtually negligible. The base station 30 and the mobile M2 are not within radio range of each other. The microcellular structures are typically used in urban areas in which obstacles cause strong attenuation of the radio field. Moreover, the microcell base station 30 is of low power, is usually located in a boxed in area and typically has an antenna at a low height. The range of the microcell base station 30 is therefore very short. In FIG. 2, for example, the microcell base station 30 is adapted to cover a street ST between buildings A shown in shaded outline. The base station 30 is at a low height in this street and its range is therefore substantially limited to the street. Interference between the mobile M2 in the macrocell 2 and the microcell base station 30 is therefore virtually nonexistent.

II/Interference between macrocell base station 20 and mobile M1.

These two types of interference are shown by the two dashed line arrows X in FIG. 3. As described previously, they are, firstly:

(a2) interference with the downlink control frequency BCCH(fd, IT0–IT7) transmitted continuously by the microcell base station 30 to the mobile M1 by the downlink traffic channel TCH(fd, ITi) transmitted from the macrocell base station 20 to the mobile M2, and, secondly:

(b1) interference with the uplink traffic channel TCH (fu, ITi) transmitted from the mobile M2 to the macrocell base station 20 by the uplink signalling channel BCCH(fu, IT0) transmitted by the mobile M1 to the microcell base station 30.

These two kinds of interference cannot be ignored and they will now be considered separately.

IIa/Interference with the control frequency signal BCCH (fd, IT0–IT7) by the traffic channel TCH(fd, ITi).

The macrocell base station 20 and the microcell base station 30 are characterized by radio parameters including the transmit power, the antenna gain, the path attenuation and the cell radius. The values given below for these parameters, both for the microcell base station 30 and for the macrocell base station 20, are representative values suitable for a practical implementation. These values have been chosen on the basis of GSM Recommendation 03.30, version 4.2.0 "Radio Network Planning Aspects", published by the ETSI in July 1993.

The values for the microcell base station 30 are:

Transmit power $P_{30}$=18 dBm,

Antenna gain $G_{30}$=3 dBi,

Path attenuation $A_{30}$=[106.7+26.log($d_{30}$)]dB,

Microcell radius $R_{30}$=200 meters, where dBm is a unit of measurement in decibels of the power of the antenna relative to a basic unit in the form of the mWatt, dBi is a unit of measurement in decibels of the power radiated by the antenna relative to a reference antenna, and $d_{30}$ is the distance in kilometers (km) between the microcell base station and the point at which the path attenuation is calculated. The units dBm, dBi and dB are coherent units.

The values for the microcell base station 20 are:

Transmit power $P_{30}$=38 dBm,

Antenna gain $G_{20}$=11 dBi,

Path attenuation $A_{20}$=[132.8+38. log($d_{20}$)]dB,

Macrocell radius $R_{20}$=1 km, where $d_{20}$ is the distance in kilometers between the macrocell base station 20 and the point at which the path attenuation is calculated. The transmit power value $P_{20}$ corresponds to a maximal power of transmission of the traffic channel TCH(fd, ITi) by the macrocell base station. In the GSM system this transmit power varies for each traffic channel transmitted according to the distance between the mobile M2 and the base station 20. It has been chosen as the maximal value to show that the invention is technically valid in an unfavorable situation.

We are concerned here with interference with the traffic channel TCH(fd, ITi) transmitted from the station 20 to the mobile M2 by the control frequency BCCH(fd, IT0–IT7) transmitted from the station 30 to the mobile M1. This is therefore interference with reception by the mobile M1, which is located in the microcell 3, due to transmission by the macrocell base station 20.

Consider the extreme situation in which the mobile M1 is 200 meters from the microcell base station 30, at the boundary of the microcell 3. The power in decibels received by the mobile M1 from the microcell base station 30 $P_{30}$ (M1) is then:

$P_{30}$ (M1)=$P_{30}$+$G_{30}$−$A_{30}$, that is:

$P_{30}$ (M1)=18 dBm+3 dBi−[106.7+26.log(0.2)]dB, that is:

$P_{30}$ (M1)≅−67.5 dBm.

The power in decibels received by the mobile M1 from the macrocell base station 20 $P_{20}$(M1) is:

$P_{20}$ (M1)=$P_{20}$+$G_{20}$−$A_{20}$, that is:

$P_{20}$ (M1)=38 dBm+11 dBi−[132.8+38. log(D)]dB, where D is the distance between the macrocell base station 20 and the mobile M1, that is:

$P_{20}$ (M1)=−[83.8+38. log(D)]dBm.

For interference with the control frequency signal BCCH (fd, IT0–IT7) by the traffic channel TCH(fd, ITi) to be negligible, it is necessary and sufficient for the power $P_{30}$ (M1) received by the mobile M1 from the microcell base station 30 to be at least 9 dB greater than the power $P_{20}$ (M1) received by the mobile M1 from the macrocell base station 20, that is:

$P_{30}$(M1)>$P_{20}$(M1)+9 dB, that is:

−67.5>−83.8−38.log(D)+9, that is:

log(D)>(−83.8+67.5+9)/38, which is equivalent to:

D>$10^{-0.19}$, that is:

D>0.645 km.

Accordingly, for interference with the control frequency signal BCCH(fd, IT0–IT7) by the traffic channel TCH(fd, ITi) to be negligible, the distance between the macrocell base station 20 and the mobile M1 must be greater than 645 meters, which is always the case regardless of the location of the mobile M1 since the radius $R_{20}$ of the macrocell 2 is 1 kilometer.

Note that the above reasoning could not be applied to the situation in which identical traffic frequencies were used for the microcell 3 and the macrocell 2. In this case, since the microcell 3 is intended to cover a boxed in urban area (typically a street) and that the receive attenuation is close to 20 dB as soon as the mobile M1 leaves this area (turns a corner), the power of the traffic channel at a given frequency received by the mobile M1 from the macrocell base station 20 after leaving the area would momentarily interfere with the downlink traffic channel set up between the mobile M1 and the microcell base station 30 at the same frequency for a critical phase of the call, namely the handover that would then be necessary.

IIb/Interference with the traffic channel TCH(fu, ITi) by the control frequency channel BCCH(fu, IT0).

Consider now interference with the control frequency channel BCCH(fu, IT0) transmitted from the mobile M1 to the station 30 by the traffic channel TCH(fu, ITi) transmitted from the mobile M2 to the station 20. Remember that the channel BCCH(fu, IT0) is transmitted from any mobile M1 in the microcell 3 to the microcell base station 30 only with a maximal repetition rate of one time slot per frame (one time slot in eight in the GSM system). The microcell can be defined by the following, entirely representative features, including traffic features:

Capacity=eight time slots (IT) per frame comprising seven traffic IT or windows and one IT, of rank 0, occupied by the control frequency channel BCCH(fu, IT0), Call blocking probability=2%, Mean call duration=80 s, Number of SDCCH channel set-ups between two calls=5, and Mean duration of data exchange in a SDCCH=4 s.

Figure 4:
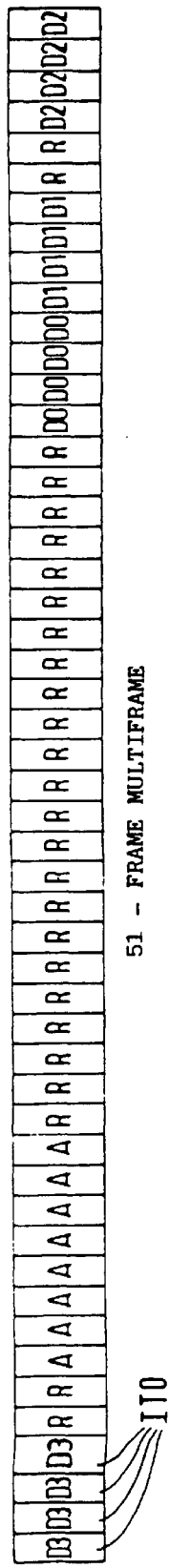
FIG. 4 shows an uplink multiframe forming the temporal logical structure for exchange of signalling data from mobiles to a cell base station in the GSM system.

The meaning of the term "SDCCH" is given below with reference to FIG. 4. FIG. 4 shows a 51-frame multiframe that defines a subchannel transmission pattern in the uplink control frequency signalling channel BCCH(fu, IT0) transmitted from the mobiles to the base station. This 51-frame multiframe defines how the transmission of the subchannels is organized in 51 successive time slots of rank 0. These subchannels are the dedicated control subchannels (SDDCH), the control subchannels associated with exchanges of information (ACCH) and the random access subchannels (RACH). The SDDCH, ACCH and RACH subchannels are respectively denoted D, A and R in FIG. 4. There are four SDCCH subchannels D0, D1, D2 and D3. The four SDCCH subchannels (D0, D1, D2 and D3) each occupy four successive time slots of rank 0 in the 51-frame multiframe. For more information on the structure of the 51-frame multiframe the reader may refer to "Systemes de radiocommunications avec les mobiles" ("Mobile Radio Systems") by Jean-Gabriel REMY et al., published by EYROLLES in its Telecommunication Science and Technology series (CNET-ENST), 1988 edition, pages 589–594.

From the number of traffic channels (which is equal to 7, as stated above) and the blocking probability (which is 2%), the traffic in Erlangs in the microcell 3 can be deduced. The traffic given by the table on page 374 of the above document "Systemes de radiocommunications avec les mobiles" is 3 Erlangs, for example. The number of calls per second in the microcell is equal to the ratio of the traffic to the mean call duration, i.e. 3/80=3.75×$10^{-2}$ calls/second. Given that the number of SDCCH channel set-ups between two calls is equal to five, the number of SDCCH channel set-ups per second is equal to five times the number of calls per second, i.e. 5×3.75×$10^{-2}$=0.187 SDCCH channel set-ups per second. The mean duration of exchange of data on an SDCCH channel is assumed to be equal to four seconds. The traffic in Erlangs on an SDCCH channel D0, D1, D2 or D3 is therefore equal to 0.187×4 Erlangs, i.e. approximately 0.75 Erlangs. There are 4 SDCCH channels D0, D1, D2 and D3.

A traffic of 0.75 Erlangs per SDCCH channel means that, statistically speaking, for a given duration t traffic of duration 0.75×t is handled. If this traffic is distributed on an equal probability basis between the four SDCCH channels D0, D1, D2 and D3, then during this same time period t each of the four SDCCH subchannels handles traffic of duration equal to (0.75/4)×t=0.19t. The mean occupancy rate of each time slot IT0 of rank 0 constituting the SDCCH channels is therefore substantially 19%.

Referring again to FIG. 4, the mean occupancy rate of the time slots of rank 0 (IT0) forming the control frequency channel BCCH(fu, IT0) is not restricted to the mean occupancy rate of each time slot IT0 of rank 0 occupied by the SDCCH subchannels, since the channel BCCH(fu, IT0) includes other subchannels (ACCH and RACH). In practice, because of their nature, these channels receive virtually no traffic. It can therefore be deduced that the mean occupancy rate of the time slots of rank 0 forming the control frequency channel BCCH(fu, IT0) is close to 19%/2, i.e. around 10%. This computation is extremely pessimistic given the hypotheses adopted and on average the results obtained are much better, 10% being a maximal value. In practice, the SDCCH channels in a microcell can be conveyed by a frequency separate from the control frequency in a time slot separate from the time slot of rank 0.

In the GSM system, most uplink messages transmitted on the SDCCH channels by the mobiles are location updating ("LocUpdate") messages. There are two types of location updating message, "mobility" messages and "periodic" messages. The mobiles transmit the mobility messages when they change area, an area being delimited by one or more macrocells. A mobile therefore typically transmits a mobility message when it enters a macrocell. The mobiles transmit the periodic messages periodically, at a predetermined frequency independent of any event. Statistically speaking, the mobiles transmit the mobility messages much more frequently. It may therefore be opportune, when installing new microcells in a given macrocell, for the SDCCH channels for the microcells nearest the outside of said given macrocell to be conveyed at a frequency separate from the control frequency in time slots separate from the time slot of rank 0 and, in the microcells nearest the center of said given macrocell, the SDCCH channels are conveyed at the control frequency in the time slot of rank 0. Accordingly, in the outermost microcells, which are the only ones likely to receive mobility location updating messages from mobiles entering said given macrocell to which these outermost microcells belong, the SDCCH channels D0, D1, D2 and D3 carried at a frequency separate from the control frequency in the time slot of rank 0 do not interfere with any traffic channel established in a macrocell adjacent to the given macrocell.

As a consequence of everything explained so far, and assuming that the uplink traffic channel TCH(fu, ITi), between the mobile M2 and the microcell base station 20 is set up in a time slot coinciding with the time slot IT0 of rank 0 conveying the control frequency channel between the mobile M1 and the microcell base station 30, only 10% of the call transmitted from the mobile M2 to the base station 20 is subject to interference.

It can be shown that the principle of the invention of using in any microcell on the outside of the coverage area of a macrocell a pair of control frequencies identical to a pair of traffic frequencies used in the macrocell is strictly limited to this implementation. It cannot be applied to the re-use of two identical pairs of traffic frequencies. It is impossible to use two identical pairs of traffic frequencies because of what is brought out in section IIa/of this description and because the interference with the uplink traffic channel set up between mobile M2 and station 20 by the uplink traffic channel set up between mobile M1 and station 30 is too high if these two channels coincide with the same frame time slot. Accordingly, compared to British patent GB-A-2 260 879, the advantage of the invention is that the microcell to be installed can use as a traffic frequency, and not as a control frequency, a frequency identical to a frequency used as traffic frequency in a remote macrocell. This optimizes frequency re-use.

The use of two identical pairs of control frequencies in the macrocell 2 and the macrocell 3 is allowed in the GSM system by distinguishing the two pairs by means of respective different Base Station Identification Codes (BSIC) in the two cells. However, this prior art solution achieves only a limited improvement in frequency re-use. The invention, on the other hand, makes a significant improvement in frequency planning given that the number of traffic frequencies in a macrocell is high and that the number of microcells (and therefore of control frequencies) used in a macrocell is also high. It follows from the above considerations that the possibility of re-using in a microcell a control frequency identical to a traffic frequency in an immediately neighboring macrocell considerably enhances the capacity of a microcellular network.

It also follows from the above considerations that the invention also provides a method for frequency optimization in a multilayer cellular mobile radio network at the time of adding a base station defining a given microcell which is part of a coverage area of a given macrocell. The method entails selecting a downlink traffic frequency used in a macrocell adjacent said given macrocell and installing the microcell base station, defining the given microcell, so that a control frequency transmitted by said microcell base station is identical to said selected downlink traffic frequency used in said adjacent macrocell.

Accordingly, a microcell of the invention is part of a coverage area of a given macrocell and uses a BCCH control frequency identical to a TCH traffic frequency used in a macrocell immediately adjacent said given macrocell. The given macrocell can correspond either to a real radio coverage area if the microcell is an internal microcell or to an imaginary coverage area, not corresponding to a radio coverage area, if the microcell is an external microcell.

The invention also provides a frequency allocation unit for a microcell belonging to a coverage area of a given macrocell. This unit is typically included in the microcell base station itself, or in a base station controller, or in an isolated equipment. It comprises means for allocating to the microcell a BCCH control frequency identical to a TCH traffic frequency used in a macrocell adjacent said given macrocell. This unit can be implemented in software.

There is claimed:

1. A method of optimizing frequency use in a multilayer cellular mobile radio network when adding any microcell base station defining a new microcell that is part of a coverage area of a given macrocell, said network being a combined time-division multiple access and frequency-division multiple access network and comprising macrocells and microcells, wherein radiotransmission between base stations of macrocells or microcells and mobiles is organized via frames comprising N time slots, each macrocell or microcell being associated with at least one downlink control frequency transmitted continuously for conveying control channels from a base station of each macrocell or microcell to said mobiles, and with at least one downlink traffic frequency transmitted with a repetition rate of one time slot per frame during calls for conveying traffic channels from a base station of each macrocell or microcell to said mobiles, said method further comprising the step of allocating to said new microcell a downlink control frequency identical to a downlink traffic frequency used in a macrocell immediately adjacent said given macrocell without scanning said macrocells to determine channel RSSI.

2. The method according to claim 1 for a network operating in duplex mode, wherein each macrocell or each microcell is further associated with at least one uplink control frequency transmitted with a maximal repetition rate of one time slot per frame for conveying control channels from said mobiles to the base station of said each macrocell or microcell, and with at least one uplink traffic frequency transmitted with a repetition rate of one time slot per frame during calls for conveying traffic channels from said mobiles to the base station of each macrocell or each microcell, wherein the uplink control frequency used by said new microcell is identical to an uplink traffic frequency used in said immediately adjacent macrocell.

3. A method of optimizing frequency used in a multilayer cellular mobile radio network when adding any microcell base station defining a new microcell that is part of a coverage area of a given macrocell, said network being a combined time-division multiple access and frequency-division multiple access network and comprising macrocells and microcells, wherein radiotransmission between base stations of macrocells or microcells and mobiles is organized via frames comprising N time slots, each macrocell or microcell being associated with at least one uplink control frequency transmitted with a maximal repetition rate of one time slot per frame for conveying control channels from a base station of each macrocell or microcell to said mobiles, and at least one uplink traffic frequency transmitted with a repetition rate of one time slot per frame during calls for conveying traffic channels from a base station of each macrocell or microcell to said mobiles, said method further comprising the step of allocating to said new microcell an uplink control frequency identical to an uplink traffic frequency used in a macrocell immediately adjacent said given macrocell without scanning said macrocells to determine channel RSSI.

4. The method according to claim 3 for a network operating in duplex mode wherein each macrocell or each microcell is further associated with at least one downlink control frequency transmitted continuously for conveying control channels from said mobiles to the base station of said each macrocell or each microcell, and with at least one downlink traffic frequency transmitted with a repetition rate of one time slot per frame during calls for conveying traffic channels from said mobiles to the base station of each macrocell or each microcell, wherein the downlink control frequency used by said new microcell is identical to a downlink traffic frequency used in said immediately adjacent macrocell.

5. A multilayer cellular mobile radio network for implementing a method of optimizing frequency use in a multilayer cellular mobile radio network when adding any microcell base station defining a new microcell that is part of a coverage area of a given macrocell, said network being a combined time-division multiple access and frequency-division multiple access network and comprising macrocells and microcells, wherein radiotransmission between base stations of macrocells or microcells and mobiles is organized via frames comprising N time slots, each macrocell or microcell being associated with at least one downlink control frequency transmitted continuously for conveying control channels from a base station of each macrocell or microcell to said mobiles, and at least one downlink traffic frequency transmitted with a repetition rate of one time slot per frame during calls for conveying traffic channels from a base station of each macrocell or microcell to said mobiles, said new microcell using a downlink control frequency identical to a downlink traffic frequency used in a macrocell immediately adjacent said given macrocell, said new microcell downlink control frequency being allocated without scanning said macrocells to determine channel RSSI.

6. The multilayer cellular radio network according to claim 5, said network operating in duplex mode wherein each macrocell or each microcell is further associated with at least one uplink control frequency transmitted with a maximal repetition rate of one time slot per frame for conveying control channels from said mobiles to the base station of said each macrocell or microcell, and with at least one uplink traffic frequency transmitted with a repetition rate of one time slot per frame during calls for conveying traffic channels from said mobiles to the base station of each macrocell or each microcell, wherein the uplink control frequency used by said new microcell is identical to an uplink traffic frequency used in said immediately adjacent macrocell.

7. The multilayer cellular mobile radio network, according to claim 5, covering an urban area.

8. The multilayer cellular mobile radio network, according to claim 5, conforming to the GSM standards.

9. The multilayer cellular mobile radio network, according to claim 5, conforming to the DCS 1800 standards.

10. A multilayer cellular mobile radio network for implementing a method when adding an microcell base station defining a new microcell that is part of a coverage area of a given macrocell, said network being a combined time-division multiple access and frequency-division multiple access network and comprising macrocells and microcells, wherein radiotransmission between base stations of macrocells or microcells and mobiles is organized via frames comprising N time slots, each macrocell or microcell being associated with at least one uplink control frequency transmitted with a maximal repetition rate of one time slot per frame for conveying control channels from a base station of each macrocell or microcell to said mobiles, and at least one uplink traffic frequency transmitted with a repetition rate of one time slot per frame during calls for conveying traffic channels from a base station of each macrocell or microcell to said mobiles, said new microcell using an uplink control frequency identical to an uplink traffic frequency used in a macrocell immediately adjacent said given macrocell, said new microcell uplink control frequency being allocated without scanning said macrocells to determine channel RSSI.

11. The multilayer cellular mobile radio network according to claim 10, said network operating in duplex mode wherein each macrocell or each microcell is further associated with at least one downlink control frequency transmitted continuously for conveying control channels from said mobiles to the base station of each macrocell or each microcell, and with at least one downlink traffic frequency transmitted with a repetition rate of one time slot per frame during calls for conveying traffic channels from said mobiles to the base station of each macrocell or each microcell, wherein the downlink control frequency used by said new microcell is identical to a downlink traffic frequency used in said adjacent macrocell.

12. The multilayer cellular mobile radio network, according to claim 10, covering an urban area.

13. The multilayer cellular mobile radio network, according to claim 10, conforming to the GSM standards.

14. The multilayer cellular mobile radio network, according to claim 10, conforming to the DCS 1800 standards.

* * * * *